United States Patent [19]

Harada

[11] Patent Number: 5,224,067
[45] Date of Patent: Jun. 29, 1993

[54] ELECTRONIC MEMO/RETRIEVAL APPARATUS WITH CONFIDENTIAL STORAGE

[75] Inventor: Kouichi Harada, Ikoma, Japan

[73] Assignee: Sharp Kabushiki Kaisha, Osaka, Japan

[21] Appl. No.: 630,769

[22] Filed: Dec. 21, 1990

Related U.S. Application Data

[63] Continuation of Ser. No. 888,721, Jul. 24, 1986, abandoned.

[30] Foreign Application Priority Data

Jul. 25, 1985 [JP] Japan .................. 60-165481

[51] Int. Cl.⁵ ............................. G06F 1/00
[52] U.S. Cl. ................. 380/4; 364/927.2; 364/918.7; 364/975; 364/927; 380/3
[58] Field of Search ... 364/200 MS File, 900 MS File; 280/3, 4, 23, 24, 25

[56] References Cited

U.S. PATENT DOCUMENTS

| | | | |
|---|---|---|---|
| 4,117,542 | 9/1978 | Klausner et al. | 364/900 |
| 4,128,874 | 12/1978 | Pertt | 364/200 |
| 4,135,240 | 1/1979 | Ritchie | 364/200 |
| 4,139,893 | 2/1979 | Poland | 364/200 |
| 4,394,731 | 7/1983 | Flusche et al. | 364/200 |
| 4,402,056 | 8/1983 | Sado et al. | 364/900 |
| 4,521,853 | 6/1985 | Gutlag | 364/200 |
| 4,604,708 | 8/1986 | Lewis | 364/900 |
| 4,618,953 | 10/1986 | Daniels et al. | 371/62 |
| 4,626,990 | 12/1986 | Komai et al. | 364/900 |
| 4,638,246 | 1/1987 | Blank et al. | 371/62 |

FOREIGN PATENT DOCUMENTS 98383 6/1973 German Democratic Rep.

OTHER PUBLICATIONS

"Elektronischer (Taschen-) Kalender" on p. 5 of Neues aus der Technik, No. 1, vol. 15, Feb. 1985, also a translated version of this article.
Technical/Scientific Computer Casio College fx-100 Instructions for Use, pp. 2 and 3.

*Primary Examiner*—Terrell W. Fears
*Assistant Examiner*—Rebecca L. Rudolph

[57] ABSTRACT

An electronic memo/retrieval apparatus comprises an input section and a memory for storing a plurality of data inputted from the input section. Particular data can be stored together with a discrimination code in the memory so as to protect the particular data from being read from the memory when a predetermined data output instruction is given from the input section.

2 Claims, 5 Drawing Sheets

ELECTRONIC MEMO/RETRIEVAL APPARATUS WITH CONFIDENTIAL STORAGE

This application is a continuation of application Ser. No. 06/888,721 filed on Jul. 24, 1986, now abandoned.

BACKGROUND OF THE INVENTION

The present invention relates to an electronic memo/retrieval apparatus, or more specifically, to an electronic memo/retrieval apparatus capable of concealing particular data.

Among the data stored in an electronic apparatus, the operator may want only some of this data to be read from the memory by an ordinary data output instruction, and the other to be held unavailable because of its secrecy.

For the conventional electronic apparatus whose secrecy protective function works for all the data stored in the apparatus, it is necessary to unlock the secrecy protective function even when data that is not confidential is to be accessed. In other words, the operator cannot call any of the data unless the operator knows how to release the secrecy protective function.

Supposing that the data is obtained by unlocking the function, it is then necessary to lock the protective function again to maintain the secrecy of the data. This relocking can be quite troublesome.

SUMMARY OF THE INVENTION

To solve the above-mentioned conventional problem, an object of the present invention is to provide an improved secrecy protective function for an electronic memo/retrieval apparatus which has an input section and a memory for storing a plurality of data inputted from the input section.

Another object of the present invention is to provide an electronic memo/retrieval apparatus capable of storing a plurality of data and concealing particular data which can be called by overriding the secrecy state.

Other objects and further scope of applicability of the present invention will become apparent from the detailed description given below. It should be understood, however, that the detailed description and the specific examples, while indicating preferred embodiments of the invention, are given by way of illustration only. Various changes and modifications within the spirit and scope of the invention will become apparent to those skilled in the art from this detailed description.

To achieve the above objects, according to an embodiment of the present invention, an electronic memo/retrieval apparatus comprises a data input section and a memory for storing a plurality of data input from the input section and wherein a particular data is stored together with discrimination codes so that this particular data is not to be read from the memory when a predetermined data output instruction is given from the input section.

BRIEF DESCRIPTION OF THE DRAWINGS

The present invention will become more fully understood from the detailed description given below and the accompanying drawings which are given by way of illustration only, and thus, are not limitative of the present invention and wherein.

DETAILED DESCRIPTION OF THE INVENTION

The construction of the present invention is described below with reference to the drawings.

According to the present invention, a particular data and discrimination code are stored in the memory so that this data is not read from the memory when a predetermined output instruction is given from the data input section.

Figure 1:
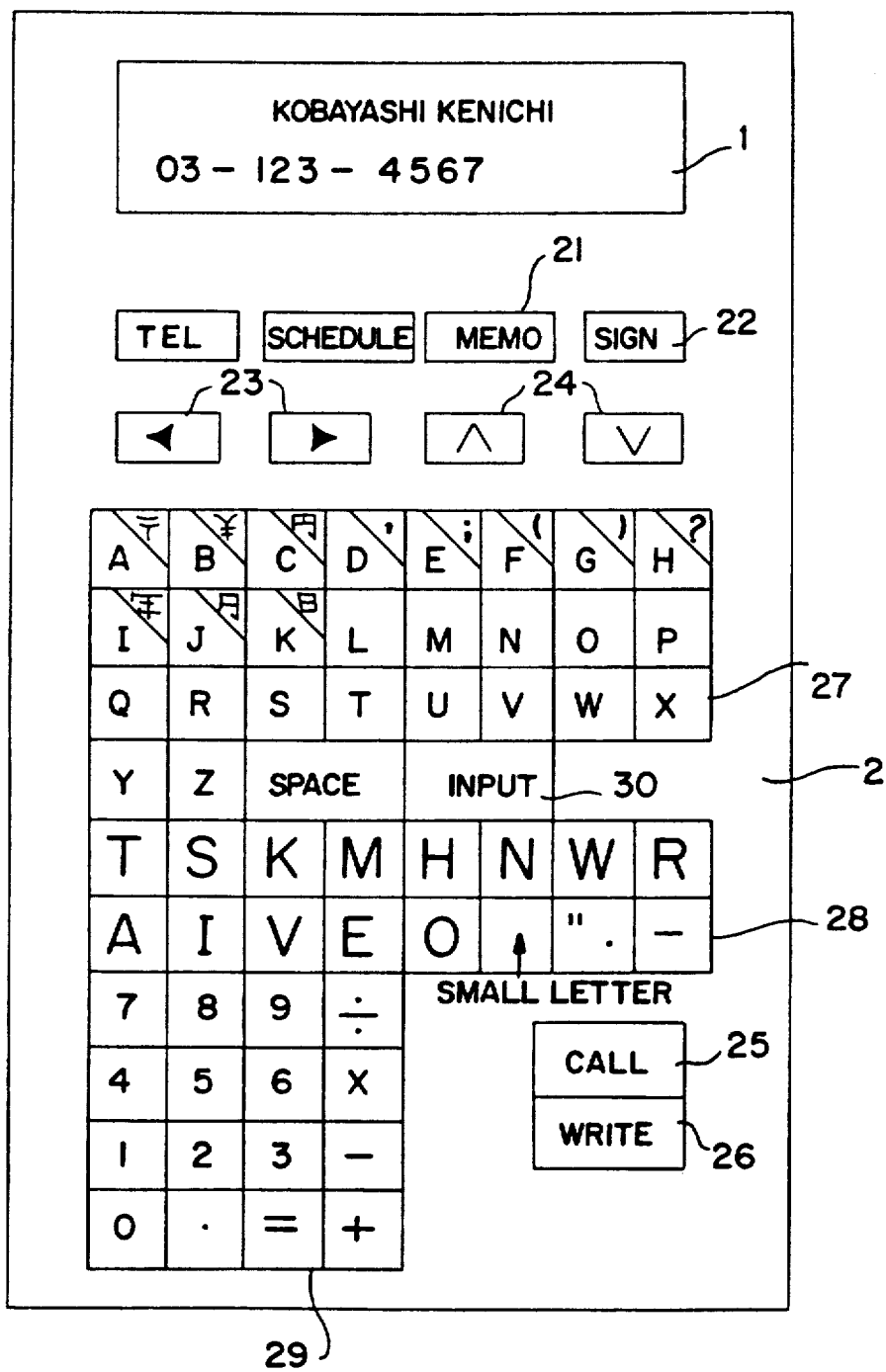
FIG. 1 shows the appearance of an embodiment of the electronic memo/retrieval apparatus of the present invention.

FIG. 1 shows the appearance of an embodiment of the electronic memo/retrieval apparatus of the present invention. As shown, the apparatus comprises a display 1 for showing the retrieved memo data and an input keyboard 2. The display 1 is composed of a liquid crystal display (LCD) with capacity of two lines.

The keyboard 2 contains the following keys:

(1) TEL, SCHEDULE, MEMO (21 in FIG. 1) Retrieval mode selection keys;
(2) SIGN (22 in FIG. 1) Sign input instruction key;
(3) , (23 in FIG. 1) Cursor shift (leftward and rightward shifts) key;
(4) , (24 in FIG. 1) Search keys for proceeding the retrieval operation;
(5) CALL (25 in FIG. 1) Lock key for giving the retrieval operation instruction to call the memo data (data to be retrieved);
(6) WRITE (26 in FIG. 1) Lock key for writing the memo data;
(7) INPUT (30 in FIG. 1) Key for giving the instruction to complete the data input;
(8) A space key and a group of alphabet keys, some of which are used for sign input keys (27 in FIG. 1)
(9) A group of alphabet keys for inputting Roman letters and "katakana" (Japanese syllabary) characters (28 in FIG. 1);
(10) A group of numeric and operation keys (29 in FIG. 1).

That is, the keyboard 2 comprises the function keys (1) through (7) and the data keys (8) through (10).

Each memo data is composed of an address item data, such as a name, date or title, and a retrieval data, such as a telephone number, residential address, schedule or memorandum.

The WRITE key 26 is operated by the operator to start the inputting of the address item data and retrieval data in pair with the keyboard and stores them in the internal memory. When the operator inputs desired address item data with the keyboard after the CALL key 25 is depressed, the corresponding memo data is called and outputted to the display 1.

Figure 2:
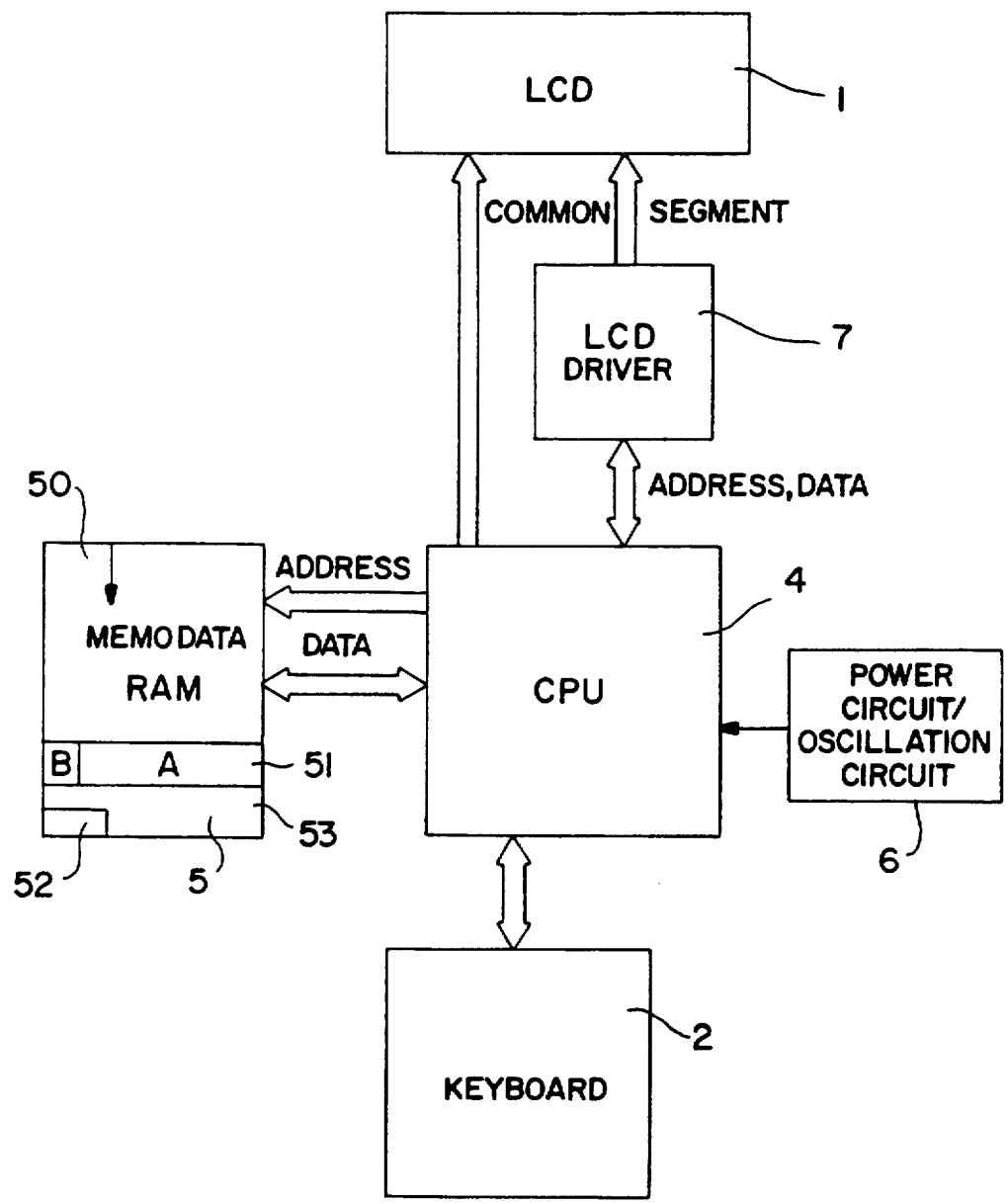
FIG. 2 is a block diagram showing the construction of the electronic memo/retrieval apparatus of FIG. 1.

The construction of the electronic memo/retrieval apparatus of the present invention is shown in FIG. 2. Numeral 1 is the display.

The display 1 displays the common data sent from a central processing unit (CPU) 4 and the segment data including display data sent from a liquid crystal display (LCD) driver 7.

Figure 3:
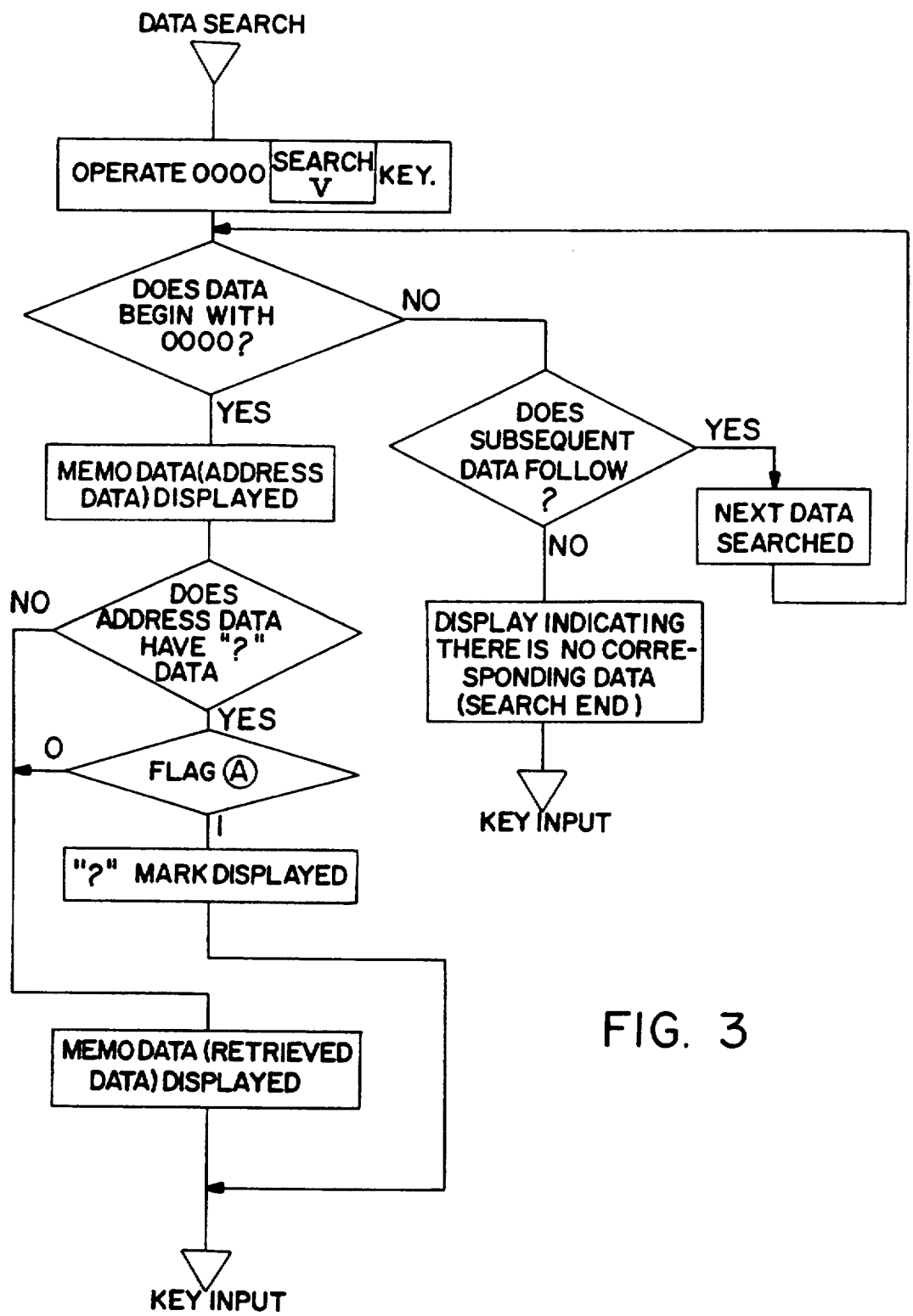
FIGS. 3 through 5 are processing flow charts of the present invention.
Figure 4:
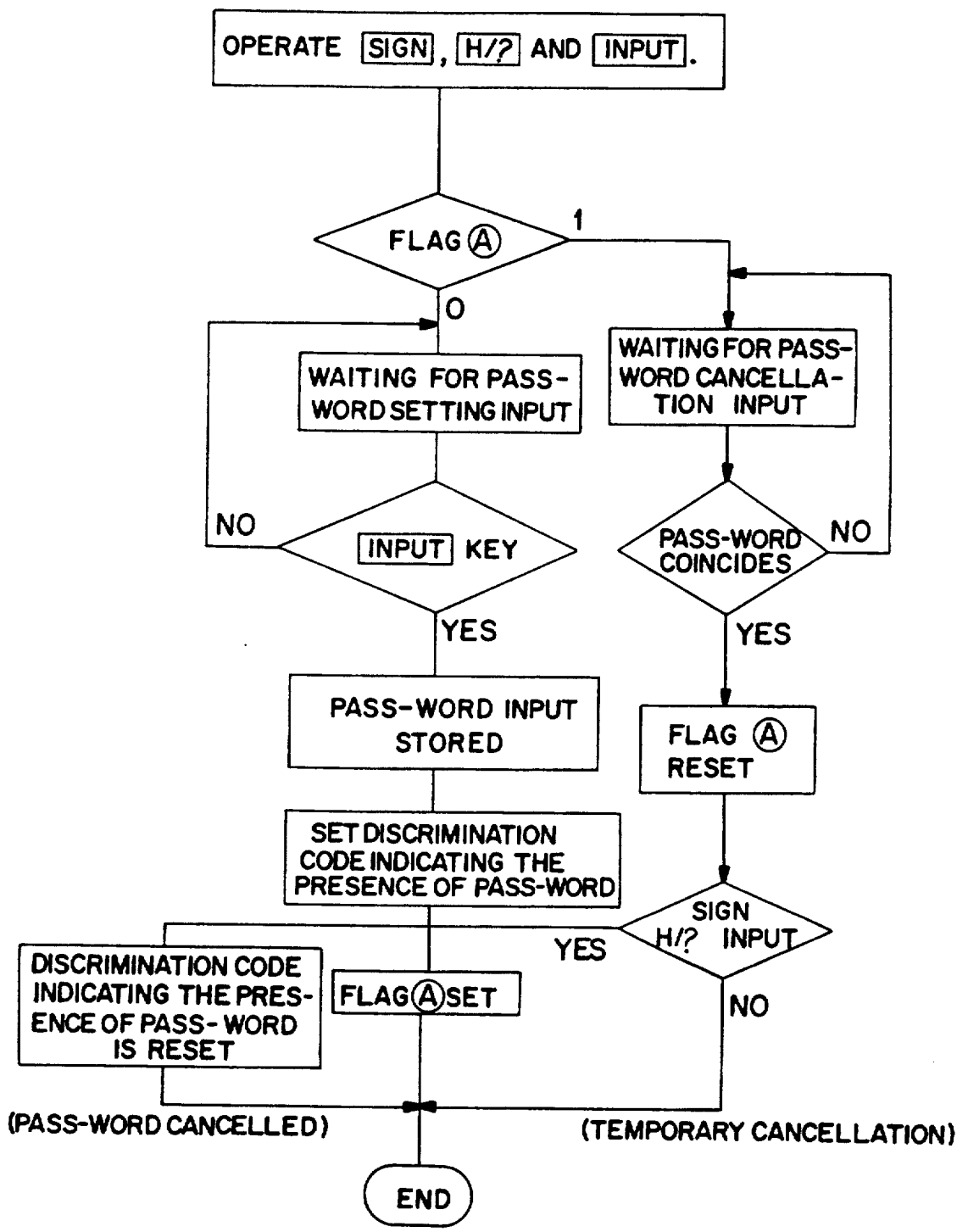
Figure 5:
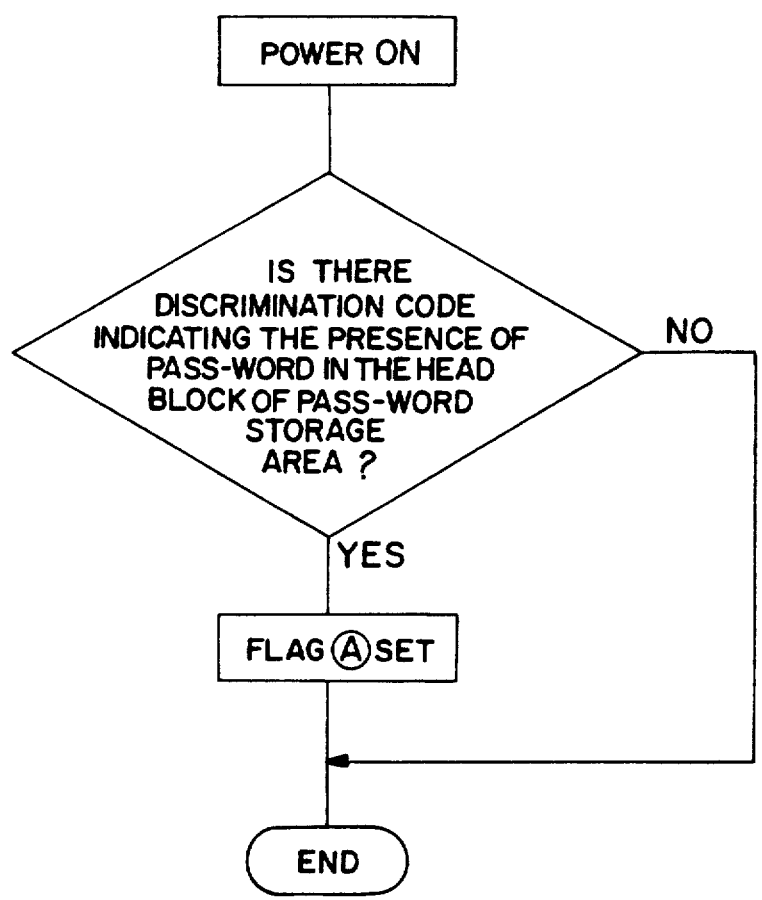

The CPU 4 processes the data according to the sequence program stored in the internal ROM (read-only-memory). A part of the sequence program is shown in FIGS. 3 through 5.

The CPU 4 is operated by a basic clock signal sent from a power circuit/oscillation circuit 6 and supplies the LCD driver 7 with segment address and display data. The CPU 4 also supplies address signals to the RAM (randon-access-memory) 5 to read/write data according to the data processing.

The RAM 5 comprises a memo data area 50 for storing a plurality of memo data, a pass-word area 51 (composed of a pass-word storage A and a storage B for pass-word discrimination codes) for storing a plurality of pass-word data and a flag (A), respectively, and other area 53 which includes various buffers, flags, and registers.

When address item data is inputted from the keyboard 2, the CPU 4 sends the corresponding address signal to the memo data area 50 of the RAM 5. Then, according to the address signal, one of the memo data is selected from the memo data area 50 and sent via the data bus to the CPU 4.

The pass-word area 51 stores codes (F6H) (i.e. a flag), indicating presence or absence of a pass-word in the head area B and pass-word data which includes a desired character string (such as the mark "?") in the area A. When there is no pass-word, a null code is stored.

The memory content of the RAM 5 is backed up by battery power supply. A timer (not shown) keeps monitoring the key inputs for a specified period of time (about 10 minutes). If no key input is detected for the specified period of time, power supply from the battery to the circuit elements other than the RAM 5 is interrupted.

Now, operation of the electronic memo/retrieval apparatus of the present invention will be described with reference to FIG. 4.

Suppose that the memo data area 50 of the RAM 5 stores a plurality of memo data in advance by the previously mentioned operation. If the memo data is confidential data, the mark "?" (discrimination code) is associated with the memo data to indicate confidential memo data.

(A) Registration of pass-word

[SIGN], [H/?] and [INPUT] keys are operated.

(1) The CPU determines the state of the flag A. (The flag (A) should be set to "0" when a pass-word is not registered.)

(2) If the flag (A)="0" and a desired pass-word is then input by the data keyboard and [INPUT] key 30 is depressed, then the pass-word character string is stored in the pass-word area 51 of the RAM 5 and the pass-word discrimination code (F6H) is stored in the head area B of the pass-word area 51. The flag (A) is then set to "1", which indicates that the secrecy protective function is registered.

(B) Permanent cancellation of pass-word

[SIGN], [H/?] and [INPUT] keys are operated.

(1) When the flag (A) is set, the pass-word registered by the above step (A) is inputted by the data keyboard, and [INPUT] key 30 is depressed causing the flag (A) to be reset.

(2) When [SIGN], [H/?] and [INPUT] keys are operated again, the discrimination code stored in the pass-word area 51 is reset so that pass-word function is permanently released. Consequently, any memo data can be read from the memory.

(C) Temporary cancellation of pass-word function

If keys other than [H/?] are operated in the above step (B) 2, pass-word function is released temporarily with the flag (A) being reset, so that any memo data can be temporarily outputted during this time.

When the power switch is turned ON after the power supply has been automatically or manually turned off, the apparatus operates as shown in FIG. 5. Specifically, the flag (A) is set if a discrimination code exists in the pass-word area 51 or the flag (A) remains reset if a discrimination code does not exist in the pass-word area 51 or namely, when pass-word function is inoperative.

When the data corresponding to the address item data is inputted from the keyboard and a search key is depressed, the apparatus executes a retrieval operation, as shown in FIG. 3.

Operation process for retrieving is as follows:

(1) If the corresponding memo data exists in the memo data area 50, the address item data is first displayed.

(2) Then, the CPU determines whether the memo data has a "?" code (discrimination code). If the memo data does not have the "?" code, the retrieval data corresponding to the displayed address item data is displayed.

(3) On the other hand, if the address item data has the "?" code and if the flag (A) is set, the pass-word function operates to cause the "?" mark to be displayed instead of the desired retrieval data corresponding to the displayed address item data.

Meanwhile, if pass-word function is cancelled temporarily or permanently, the flag (A) is reset so that all of the data can be output to the display.

After the temporary pass-word cancellation and turning the power supply OFF and ON again, the flag (A) will be set so that secrecy protective function will again operate with the same pass-word.

According to the present inventions, as mentioned above, when inputting memo data from the keyboard 2 to store them in the internal memory 5, a "?" code (discrimination code) is added to the address item data corresponding to the memo data if particular memo data is confidential. Pass-word (secret code) peculiar to each operator is also stored for the confidential memo data, so that the confidential data is outputted to the display only when the pass-word is inputted.

In the case where a plurality of memo data is stored and then, at least one of the memo data is recalled, if the pass-word is not inputted and the memo data with "?" code is called, only the address data is outputted.

By inputting a pass-word, the secrecy protective function is released and the confidential memo data can be outputted to the display.

After calling confidential memo data by the pass-word and turning the power supply OFF and ON again, the secrecy protective function will be restored.

The electronic memo/retrieval apparatus of the present invention is equipped with an auto power OFF function that automatically prevents the power supply to the apparatus if no key input is detected for the specified period of time. Therefore, if the apparatus is not operated for this period of time with the secrecy protective function released, the power supply to the apparatus will be turned off after the predetermined time elapses, allowing the secrecy protective function to be recovered.

According to the present invention, as understood from the above, it is possible to permit any of the plurality of memo data stored in the memory to be read or to permit memo data other than the particular data with a discrimination code to be read, depending upon data output instruction. Accordingly, data not needing secrecy can be accessed at any time by anybody while confidential data can be displayed only when secrecy protective function is released by a pass-word.

While only certain embodiments of the present invention have been described, it will be apparent to those skilled in the art that various changes and modifications may be made therein without departing from the spirit and scope of the present invention as claimed.

What is claimed is:

1. An electronic memo/retrieval apparatus comprising:

input means for inputting data and operator selected discrimination codes and passwords;

control means operatively connected to said input means for adding a discrimination code input by an operator to selected segments of data input by the operator through said input means;

memory means for storing said selected segments of data with said discrimination code, for storing remaining segments of data which lack a discrimination code and for storing operator selected passwords;

output means operatively connected to said control means for displaying data;

said control means withdrawing any of said data segments from said memory means upon a request by the operator, said control means thereafter permitting processing of said data segments, said control means further permitting said output means to display any of said remaining segments of data whereby said remaining segments are held nonconfidentially, said control means also permitting said output means to display said selected segments of data having the discrimination code when a password is stored in the memory means only when an operator inputs a password corresponding to the password stored in the memory means whereby said selected segments are held in secrecy, said control means thereby permitting use of all data held in said memory means while maintaining said selected data segments in secrecy;

power supply means for supplying power to said apparatus, said power supply means being controllable by at least the operator; and timer means operatively connected to said control means for monitoring input by said input means and for detecting whether there is any activity for a specified period of time, said timer means thereafter terminating power to said apparatus by said power supply means if there is no activity for said specified period of time;

whereby when the password is stored in the memory means and when one of said timer means terminates power to said apparatus, said selected data segments are prohibited from being displayed until a password corresponding to the password stored in said memory means is input through said input means even if said password has been input before termination of power supply.

2. The electronic memo/retrieval apparatus as recited in claim 1, further comprising overridding means for temporarily or permanently cancelling a password stored in the memory means whereby said selected segment with said discrimination code added thereto will be held nonconfidentially.

* * * * *